(12) United States Patent
Masefield et al.

(10) Patent No.: US 12,071,225 B2
(45) Date of Patent: *Aug. 27, 2024

(54) SYSTEM AND METHOD TO MINIMIZE AN AIRCRAFT GROUND TURN RADIUS

(71) Applicant: Electra Aero, Inc., Manassas, VA (US)

(72) Inventors: Oliver Masefield, Stans (CH); Mark Drela, Cambridge, MA (US)

(73) Assignee: Electra Aero, Inc., Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,352

(22) Filed: Nov. 2, 2023

(65) Prior Publication Data

US 2024/0059403 A1 Feb. 22, 2024

Related U.S. Application Data

(63) Continuation of application No. 18/122,532, filed on Mar. 16, 2023, now Pat. No. 11,851,168.

(60) Provisional application No. 63/321,297, filed on Mar. 18, 2022.

(51) Int. Cl.
*B64C 25/50* (2006.01)
*B64D 27/24* (2024.01)
*B64D 31/06* (2024.01)

(52) U.S. Cl.
CPC .............. *B64C 25/50* (2013.01); *B64D 27/24* (2013.01); *B64D 31/06* (2013.01)

(58) Field of Classification Search
CPC .......... B64C 25/50; B64D 27/24; B64D 31/06
See application file for complete search history.

(56) References Cited

U.S. PATENT DOCUMENTS

| 4,397,254 | A | 8/1983 | Deady |
| 6,102,330 | A | 8/2000 | Burken et al. |
| 7,592,929 | B2 | 9/2009 | Pepitone |
| 7,623,044 | B2 | 11/2009 | Pepitone et al. |
| 8,437,891 | B2 | 5/2013 | Yakimenko et al. |
| 9,257,048 | B1 | 2/2016 | Offer et al. |
| 10,055,999 | B2 * | 8/2018 | Lissajoux ............ G05D 1/0061 |

(Continued)

FOREIGN PATENT DOCUMENTS

| CN | 115485194 A | 12/2022 |
| GB | 2596290 A | 12/2021 |
| WO | 2021219126 A1 | 11/2021 |

*Primary Examiner* — Donald J Wallace
*Assistant Examiner* — Jalal C Coduroglu
(74) *Attorney, Agent, or Firm* — Duane Morris LLP

(57) ABSTRACT

Systems and methods for minimizing an aircraft turn radius are disclosed. For example, a method to minimize an aircraft turn radius may include receiving an activation signal from an activation switch. The activation switch may be configured allow a selected turn. The method may also include receiving a turn command in a direction of the selected turn. The method may also include transmitting a turn signal to an actuator operatively coupled to a nosewheel assembly. The actuator may rotate a shaft in the direction of the selected turn to move at least one nosewheel from a first angle to a second angle with reference to a longitudinal axis of the aircraft. The method may also include transmitting a thrust signal to at least one of a plurality of thrust-producing devices operatively coupled to a first wing and a second wing operatively coupled to the aircraft.

20 Claims, 6 Drawing Sheets

(56) References Cited

U.S. PATENT DOCUMENTS

| | | | |
|---|---|---|---|
| 11,198,519 B1 | 12/2021 | Seeley | |
| 2005/0007257 A1* | 1/2005 | Rast | G02B 27/017 |
| | | | 340/815.45 |
| 2006/0038068 A1* | 2/2006 | Sullivan | B64C 25/50 |
| | | | 244/103 S |
| 2006/0054067 A1 | 3/2006 | Hoberman et al. | |
| 2006/0234537 A1 | 10/2006 | Sugitani | |
| 2007/0240056 A1* | 10/2007 | Pepitone | G05D 1/0083 |
| | | | 715/705 |
| 2007/0241935 A1* | 10/2007 | Pepitone | G05D 1/0083 |
| | | | 340/958 |
| 2008/0147252 A1 | 6/2008 | Bayer | |
| 2008/0296429 A1* | 12/2008 | Edelson | B64F 1/22 |
| | | | 244/50 |
| 2009/0261197 A1 | 10/2009 | Cox et al. | |
| 2011/0036939 A1 | 2/2011 | Easter | |
| 2012/0215393 A1 | 8/2012 | Schiedegger | |
| 2017/0169703 A1 | 6/2017 | Carrasco et al. | |
| 2019/0154439 A1 | 5/2019 | Binder | |
| 2019/0172348 A1 | 6/2019 | Rivers et al. | |
| 2019/0359300 A1 | 11/2019 | Johnson et al. | |
| 2020/0294401 A1 | 9/2020 | Kerecsen | |
| 2021/0083550 A1* | 3/2021 | Kato | H02K 7/083 |
| 2021/0134164 A1* | 5/2021 | Bouda | B64D 43/00 |
| 2022/0403790 A1 | 12/2022 | Fletcher et al. | |
| 2023/0063801 A1 | 3/2023 | Courtin et al. | |
| 2023/0227151 A1* | 7/2023 | Gauci | B64C 13/042 |
| | | | 701/3 |
| 2023/0280764 A1 | 9/2023 | Hansman et al. | |
| 2023/0294824 A1 | 9/2023 | Masefield et al. | |

\* cited by examiner

SYSTEM AND METHOD TO MINIMIZE AN AIRCRAFT GROUND TURN RADIUS

CROSS-REFERENCE TO RELATED APPLICATION

This application is a continuation of U.S. patent application Ser. No. 18/122,532 filed Mar. 16, 2023, now U.S. Pat. No. 11,851,168, which claims the benefit of priority under 35 U.S.C. § 119(e) to prior U.S. Provisional Application No. 63/321,297 filed on Mar. 18, 2022, the disclosures of which are incorporated by reference herein in their entirety.

FIELD OF DISCLOSURE

The present disclosure generally relates to the field of aviation. More specifically, the present disclosure relates to minimizing an aircraft ground turn radius with a configurable nosewheel and a plurality of thrust producing devices capable of differential thrust.

BACKGROUND OF THE INVENTION

Smaller aircraft need to be maneuverable in order to taxi and park in space limiting areas. FIG. 1 illustrates the typical turn radius of a conventional aircraft 100. These conventional aircraft 100 are maneuvered through active steering using an actuator or direct linkage to the rudder pedals or through a "free castoring" nose gear 102, which is free to move in any direction. The power for the maneuver typically comes from a thrust producing device(s) 104, such as a propeller, jet engine, or other means for producing thrust. However, the radius of the maneuver is limited by the landing gear wheel 106 on the inside of the turn. This maneuvering limitation leads to a typical turn radius of 1.5 wingspans or greater for conventional aircraft 100 due to the pivot point 108 of the turn not being the center of gravity 110. A turn using conventional means is illustrated by the dashed line showing the right wing 112 moving from point 1 to point 2 during a 180 degree turn.

In order to achieve the absolute minimum turn radius in these conventional maneuvering configurations, the inside landing gear wheel 106 would need to have a brake engaged in order to prevent the wheel from turning. This braking of the inside landing gear wheel 106 during a turn is typically not done in practice due to the high likelihood of tire damage and eventual failure. For aircraft that operate in very confined spaces (e.g., "Vertiport", Heliport, barge, or rooftop), such as eSTOL or VTOL aircraft, these conventional maneuvering means may not be adequate.

The present disclosure addresses the aforementioned challenges and problems regarding the ground maneuvering of aircraft. Embodiments of the present disclosure advantageously provide a turn radius control system, including a nosewheel assembly, to allow for a minimized ground turn radius during a turn.

SUMMARY OF THE DISCLOSURE

In some embodiments, a turn radius control system may include a nosewheel assembly operatively coupled to an aircraft. The nosewheel assembly may include at least one nosewheel, a shaft, and an actuator operatively coupled to the nosewheel assembly. The at least one nosewheel may be configured to rotate. The actuator may be configured to rotate the shaft so that the at least one nosewheel is moved from a first angle to a second angle with reference to a longitudinal axis of the aircraft. The turn radius control system may also include an activation switch operatively coupled to the aircraft and communicatively coupled to a computing device. The activation switch may be configured to allow the nosewheel assembly to move in a direction of a selected turn. The computing device may include a steering controller communicatively coupled to the nosewheel assembly and the computing device. The steering controller may be configured to transmit a turn signal to the actuator based at least in part on receiving a turn command. The actuator may then rotate the shaft in a direction of the selected turn based on the turn signal. The turn radius control system may also include a thrust controller communicatively coupled to the computing device and a plurality of thrust-producing devices operatively coupled to a first wing and a second wing of the aircraft. The thrust controller may be configured to transmit a thrust signal to at least one of the plurality of thrust-producing devices based at least in part on the turn command. The plurality of thrust-producing devices may include at least one outboard thrust-producing device on the first wing and the second wing.

In some embodiments, a method to minimize an aircraft turn radius may include receiving an activation signal from an activation switch. The activation switch may be configured allow a selected turn. The method may also include receiving a turn command in a direction of the selected turn. The method may also include transmitting a turn signal to an actuator operatively coupled to a nosewheel assembly operatively coupled to an aircraft. The actuator may then rotate a shaft in the direction of the selected turn in order to move at least one nosewheel from a first angle to a second angle with reference to a longitudinal axis of the aircraft. The method may also include transmitting a thrust signal to at least one of a plurality of thrust-producing devices operatively coupled to a first wing and a second wing operatively coupled to the aircraft. The plurality of thrust-producing devices may include at least one outboard thrust-producing device on the first wing and at least one thrust producing device on the second wing.

As will be disclosed herein, the turn radius control system may be used to minimize the space needed to turn while on the ground. This reduction in space needed to complete a turn may be advantageous in operating areas with limited space, such as a Heliport or rooftop.

BRIEF DESCRIPTION OF THE DRAWINGS

The features and advantages of the present disclosure will be more fully disclosed in, or rendered obvious by the following detailed descriptions of example embodiments. The detailed descriptions of the example embodiments are to be considered together with the accompanying drawings wherein like numbers refer to like parts and further wherein.

Figure 1:
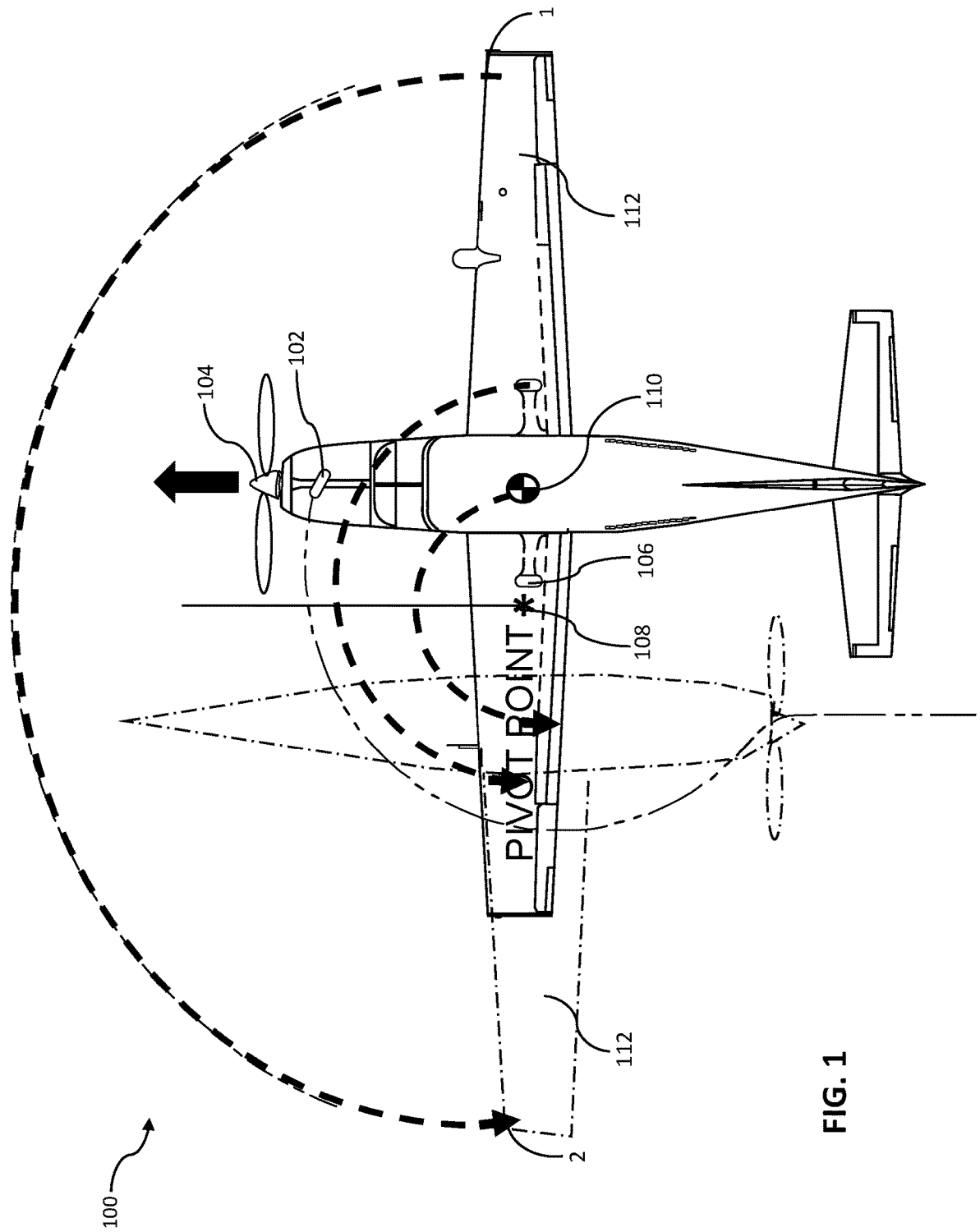
FIG. 1 illustrates the typical turn radius of a conventional aircraft in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

This description of the exemplary embodiments is intended to be read in connection with the accompanying drawings, which are to be considered part of the entire written description. It should be understood, however, that the present disclosure is not intended to be limited to the particular forms disclosed and that the drawings are not necessarily shown to scale. Rather, the present disclosure covers all modifications, equivalents, and alternatives that fall within the spirit and scope of these exemplary embodiments. In the description, relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The terms "couple," "coupled," "operatively coupled," "operatively connected," and the like should be broadly understood to refer to connecting devices or components together either mechanically, or otherwise, such that the connection allows the pertinent devices or components to operate with each other as intended by virtue of that relationship.

The present disclosure is directed to turn radius control systems and methods to minimize the ground turn radius of an aircraft for improved maneuverability in confined spaces. According to various embodiments, the turn radius control system is used in an aircraft with electric propulsion having short takeoff and landing (eSTOL) capabilities. In some embodiments, the control system could be used in an aircraft with vertical takeoff and landing (e.g., VTOL) capabilities or a conventional aircraft with conventional means for producing thrust.

Figure 2:
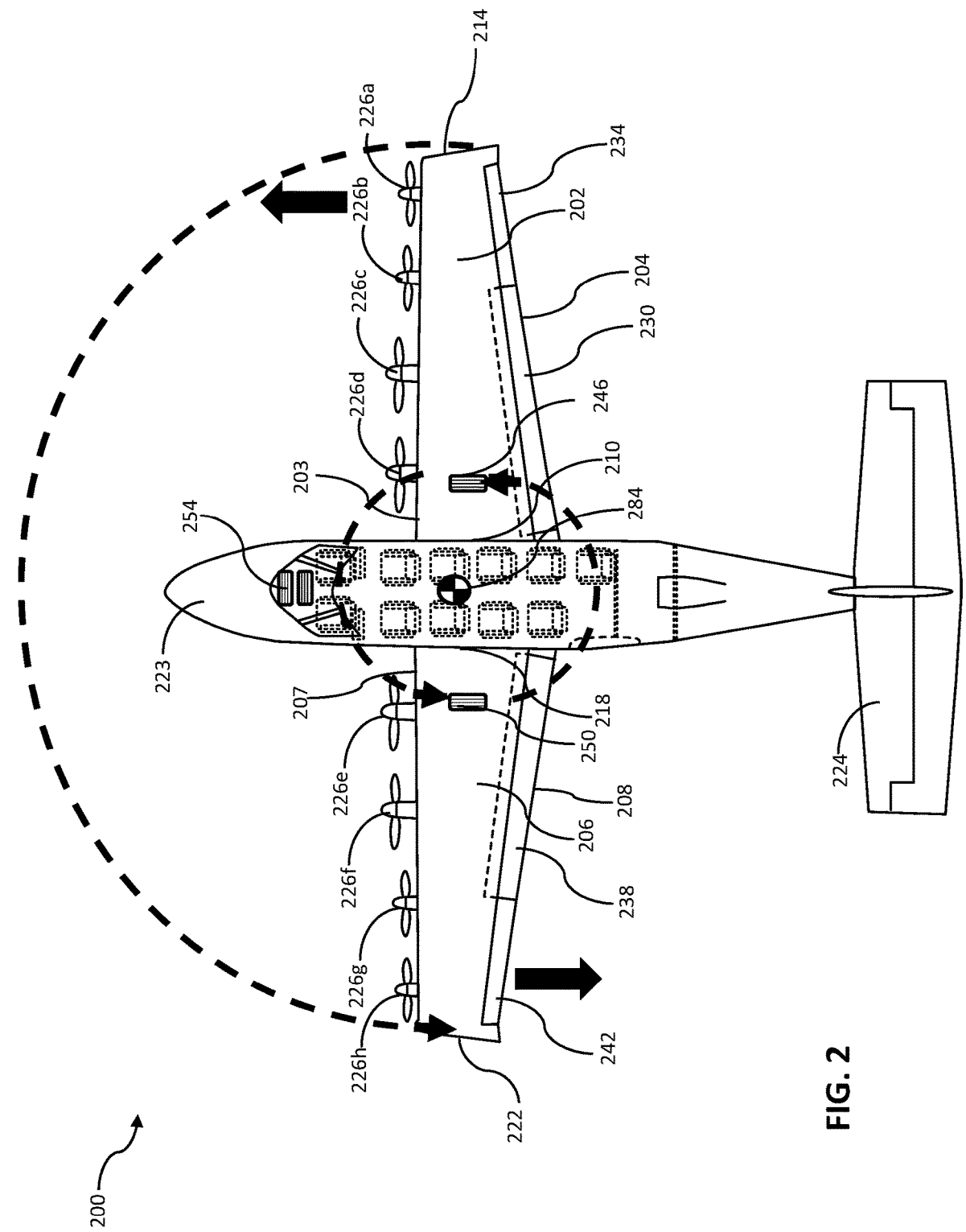
FIG. 2 illustrates a minimized turn radius of an aircraft configured with a turn radius control system in accordance with some embodiments.

FIG. 2 illustrates an aircraft 200 configured with a turn radius control system in accordance with some embodiments. The aircraft 200 is oriented along a longitudinal axis and includes a pair of wings with a first wing 202 and a second wing 206 operatively coupled to the aircraft. The first wing 202 is disposed between a first inboard end 210 and a first outboard end 214, and a first leading edge 203 and a first trailing edge 204. The second wing 206 is disposed between a second inboard end 218 and a second outboard end 222, and a second leading edge 207 and a second trailing edge 208. The first wing 202 and the second wing 206 may be made of any suitable material for an aircraft wing, such as metal alloy or a form of reinforced plastic, etc. The aircraft 200 also includes a nose 223 and a tail 224 operatively coupled to the aircraft 200. The aircraft 200 further includes a plurality of thrust-producing devices 226a-d operatively coupled to the first leading edge 203 of the first wing 202 and a plurality of thrust-producing devices 226e-h operatively coupled to the second leading edge 207 of the second wing 206. It shall be noted that more or less thrust-producing devices 226a-h may be provided in various embodiments of aircraft 200. In some embodiments, the thrust-producing devices 226a-h are electric propulsion units (EPUs) with propellers that are part of a distributed electric propulsion (DEP) system.

In some embodiments, aircraft 200 is a blown lift aircraft 200, which refers to an aircraft that comprises at least two thrust-producing devices 226a-h. The thrust-producing devices 226a-h develop slipstreams that blow over a substantial portion of the first wing 202 and the second wing 206 to augment the lift generated. The control surfaces of the blown lift aircraft 200, such as the flap 230 and aileron 234 (or flaperon) operatively coupled to the first trailing edge 204 and the second flap 238 and second aileron 242 operatively coupled to second trailing edge 208, may be deflected or drooped to interact with the slipstreams from the thrust-producing devices 226a-h further augmenting the lift produced. Further disclosure of a blown lift aircraft 200 with EPUs can be found in U.S. patent application Ser. No. 17/560,383 filed on Dec. 23, 2021, the disclosure of which is incorporated by reference herein in its entirety.

The aircraft 200 also includes a landing gear assembly that includes a first landing gear wheel 246 operatively coupled to the first wing 202, a second landing gear wheel 250 operatively coupled to the second wing 206, and a nosewheel assembly 254 operatively coupled to the aircraft 200. The landing gear assembly is configured to allow the aircraft 200 to safely land on a landing surface, such as a paved runway, dirt runway, rooftop, barge, heliport, etc.

Figure 3B:
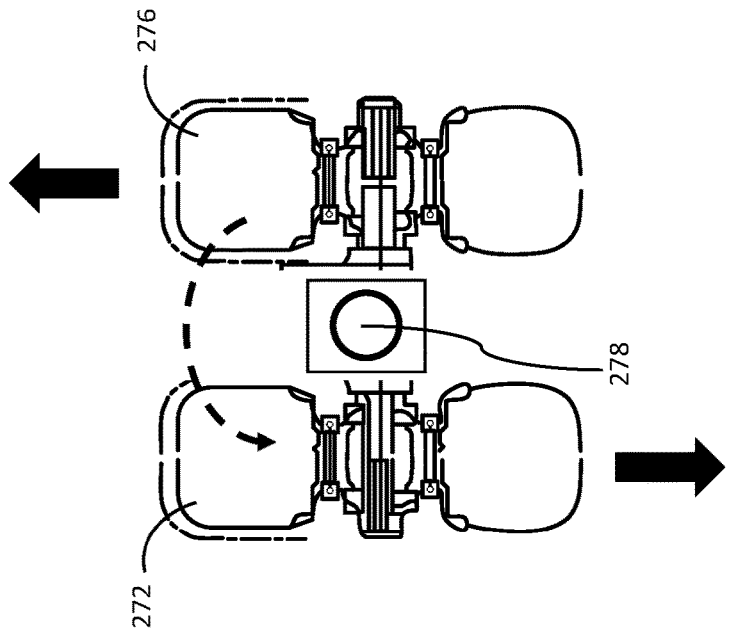
FIG. 3B illustrates a top view of the nosewheel assembly in accordance with some embodiments.
Figure 3A:
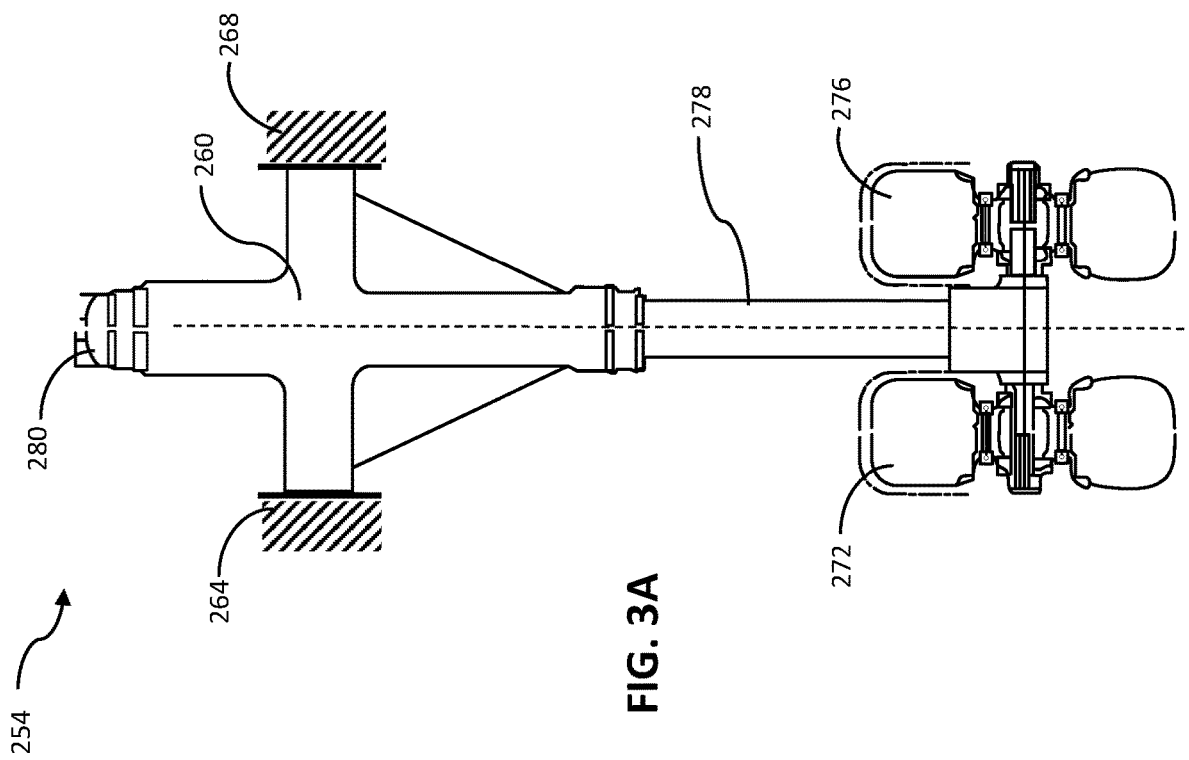
FIG. 3A illustrates a nosewheel assembly of a turn radius control system in accordance with some embodiments.

Referring now to FIGS. 3A-3B, which illustrates the nosewheel assembly 254 of the turn radius control system 300 described herein. The nosewheel assembly 254 includes a housing 260 along a vertical axis that is operatively coupled to the landing gear assembly of aircraft 200 at a first connection point 264 and a second connection point 268. The nosewheel assembly 254 also includes a shaft 278 that is free to rotate within the housing 260 to achieve a steering function and to move vertically within housing 260 as part of the impact absorption mechanism. The nosewheel assembly 254 further includes a first nosewheel 272 and a second nosewheel 276 configured to rotate in 360 degrees. It shall be noted that more or less nosewheels 272, 276 may be included on the nosewheel assembly 254.

The nosewheel assembly 254 also includes an actuator 280 operatively coupled to the shaft 278 of the nosewheel assembly 254. The actuator 280 is communicatively coupled to a computing device, described in detail below, and configured to rotate the shaft 278 so that first nosewheel 272 and second nosewheel 276 move from a first angle to a second angle in response to a turn signal from the computing device. The shaft 278 is configured to move from 0 to 90 degrees with reference to the aircraft's 200 longitudinal axis. For example, for a turn to the left (or counterclockwise) operation of the actuator 280 causes the shaft 278 to rotate. The rotation from the shaft 278 causes the first nosewheel 272 to move forward and the second nosewheel 276 to freely move rearwards as illustrated by the directional arrows in FIG. 3B. The rotation of the shaft 278 is complete when the first nosewheel 272 and the second nosewheel 276 have turned 90 degrees, as illustrated by the dashed curved line in FIG. 3B for a turn to the left. This free rotation of the first nosewheel 272 and the second nosewheel 276 while the shaft 278 is rotating allows the actuator 280 to turn the shaft 278 with low torque while the aircraft 200 is stationary.

During normal operation, the shaft 278 may have a limited range of motion to accomplish phases of flight such as taxiing, takeoff, and landing. However, the limited range of motion will be relaxed when the aircraft is required to turn, as will be described herein. In some embodiments, the actuator 280 may be powered electrically, hydraulically, pneumatically, or with springs. In some embodiments, the actuator can be a linear actuator connected at a different point on the shaft 278. The actuator 280 may also act as a locking device. The actuator 280 may prevent the rotation of the shaft 278 when a minimized turn radius maneuver is not desired or lock the shaft 278 at the second angle during the selected turn. In other embodiments, a separate actuator may be designated for shaft 278 rotation and a separate limited movement actuator (not shown) will be decoupled when a selected turn is not occurring.

Figure 4:
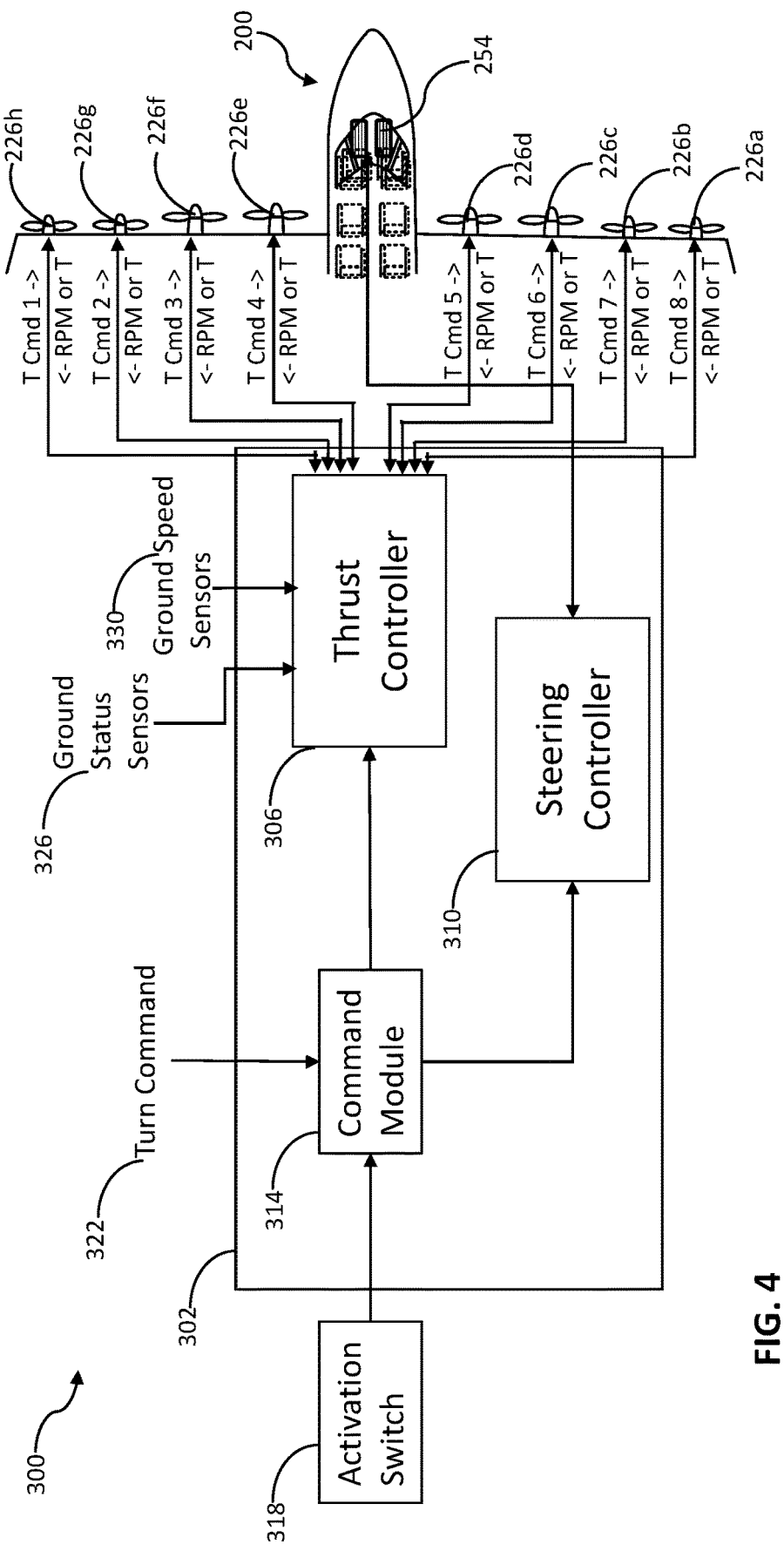
FIG. 4 illustrates a block diagram of the logic for the turn radius control system in accordance with some embodiments.

FIG. 4 illustrates a block diagram of the logic for the turn radius control system 300 in accordance with some embodiments. The turn radius control system 300 includes aircraft 200 with nosewheel assembly 254 and the plurality of thrust-producing devices 226a-h as described above with reference to FIGS. 2-3. The turn radius control system 300 also includes a turning computer 302, which is operatively coupled to the aircraft and communicatively coupled the nosewheel assembly 254 and thrust-producing devices 226a-h. The turning computer 302 includes several modules, such as a thrust controller 306, a steering controller 310, and a command module 314. It can be appreciated that the modules can be implemented in software, hardware, and/or a combination thereof.

Figure 5:
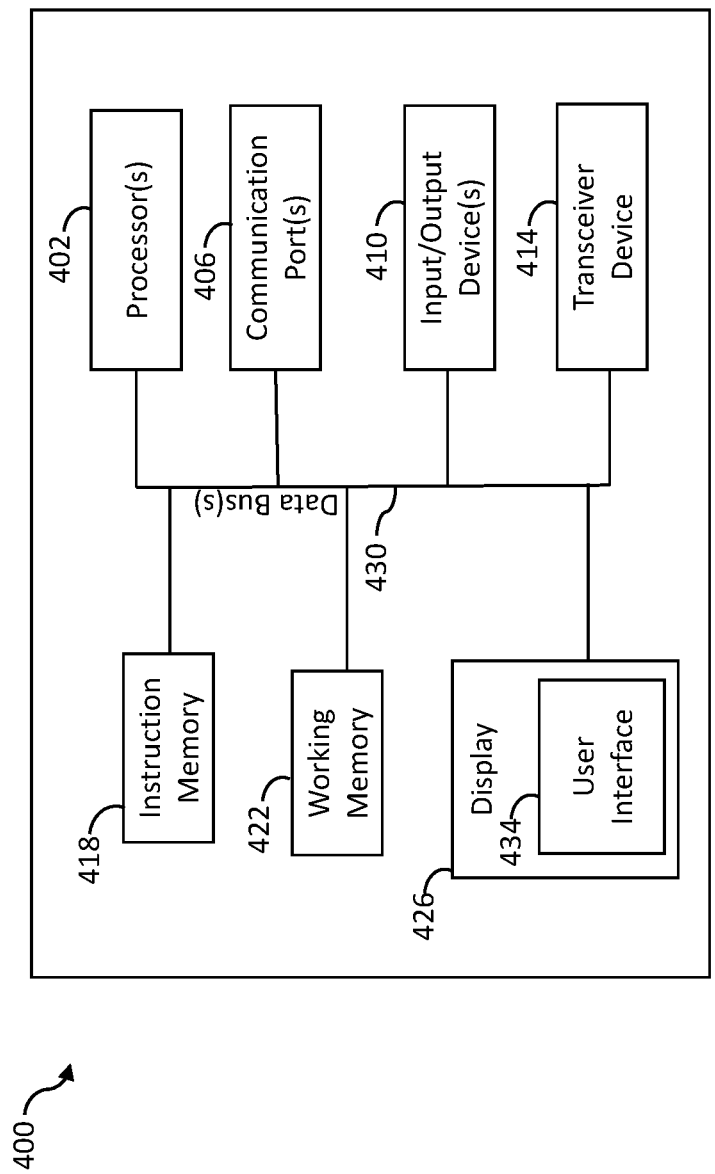
FIG. 5 illustrates an exemplary computing device for controlling the turn radius of an aircraft in accordance with some embodiments.

FIG. 5 is a block diagram of an example computing device 400 in accordance with some embodiments. The computing device 400 can be employed by a disclosed system or used to execute a disclosed method of the present disclosure. Computing device 400, such as the turning computer 302 in FIG. 4, can implement, for example, one or more of the functions described herein. It should be understood, however, that other computing device configurations are possible.

Computing device 400 can include one or more processors 402, one or more communication port(s) 406, one or more input/output devices 410, a transceiver device 414, instruction memory 418, working memory 422, and optionally a display 426, all operatively coupled to one or more data buses 430. Data buses 430 allow for communication among the various devices, processor(s) 402, instruction memory 418, working memory 422, communication port(s) 406, and/or display 426. Data buses 430 can include wired, or wireless, communication channels. Data buses 430 are connected to one or more devices. In some embodiments, the data bus 430 may be a Controller Area Network (CAN) bus, Aeronautical Radio INC. (ARINC) 429 bus, or any one of the Institute of Electrical and Electronics Engineers (IEEE) buses available.

Processor(s) 402 can include one or more distinct processors, each having one or more cores. Each of the distinct processors 402 can have the same or different structures. Processor(s) 402 can include one or more central processing units (CPUs), one or more graphics processing units (GPUs), application specific integrated circuits (ASICs), digital signal processors (DSPs), and the like.

Processor(s) 402 can be configured to perform a certain function or operation by executing code, stored on instruction memory 418, embodying the function or operation of the turn radius control system 300 illustrated in FIG. 4. For example, processor(s) 402 can be configured to perform one or more of any function, method, or operation disclosed herein.

Communication port(s) 406 can include, for example, a serial port such as a universal asynchronous receiver/transmitter (UART) connection, a Universal Serial Bus (USB) connection, or any other suitable communication port or connection. In some examples, communication port(s) 406 allows for the programming of executable instructions in instruction memory 418. In some examples, communication port(s) 406 allow for the transfer, such as uploading or downloading, of data.

Input/output devices 410 can include any suitable device that allows for data input or output. For example, input/output devices 410 can include one or more of a keyboard, a touchpad, a mouse, a stylus, a touchscreen, a physical button, a speaker, a microphone, or any other suitable input or output device.

Transceiver device 414 can allow for communication with a network, such as a Wi-Fi network, an Ethernet network, a cellular network, or any other suitable communication network. For example, if operating in a cellular network, transceiver device 414 is configured to allow communications with the cellular network. Processor(s) 402 is operable to receive data from, or send data to, a network via transceiver device 414.

Instruction memory 418 can include an instruction memory 418 that can store instructions that can be accessed (e.g., read) and executed by processor(s) 402. For example, the instruction memory 418 can be a non-transitory, computer-readable storage medium such as a read-only memory (ROM), an electrically erasable programmable read-only memory (EEPROM), flash memory, a removable disk, CD-ROM, any non-volatile memory, or any other suitable memory with instructions stored thereon. For example, the instruction memory 418 can store instructions that, when executed by one or more processors 402, cause one or more processors 402 to perform one or more of the operations of the turn radius control system 300.

In addition to instruction memory 418, the computing device 400 can also include a working memory 422. Processor(s) 402 can store data to, and read data from, the working memory 422. For example, processor(s) 402 can store a working set of instructions to the working memory 422, such as instructions loaded from the instruction memory 418. Processor(s) 402 can also use the working memory 422 to store dynamic data created during the operation of computing device 400. The working memory 422 can be a random access memory (RAM) such as a static random access memory (SRAM) or dynamic random access memory (DRAM), or any other suitable memory.

Display 426 is configured to display user interface 434. User interface 434 can enable user interaction with computing device 400. In some examples, a user can interact with user interface 434 by engaging input/output devices 410. In some examples, display 426 can be a touchscreen, where user interface 434 is displayed on the touchscreen.

Referring back to FIG. 4, the command module 314 configured to receive an input from an activation switch 318, which can be a physical input (e.g., hydraulic, pneumatic, etc.) and/or an electrical signal. The activation switch 318 which is communicatively coupled to the turning computer 302 and operatively coupled to the aircraft 200. The activation switch 318 can be configured to transmit an activation signal to the turning computer 302 and command module 314 indicating that a turn is allowed and about to occur when the activation switch 318 is energized. The activation switch 318 may be a physical switch, dial, soft-key, etc. located in the cockpit of the aircraft 200 or may be a touchscreen option on a user interface 434 of a display 426. The command module 314 also receives an input from a turn command 322, such as deflection of rudder pedals (not shown) or steering tiller (not shown) or any other type of turn command that a person of ordinary skill in the art would appreciate.

The steering controller 310 is communicatively coupled to the command module 314 and the nosewheel assembly 254. The steering controller 310 is configured to transmit a turn signal to the actuator 280 of the nosewheel assembly 254 in response to receiving a turn command signal from the command module 314 that a selected turn is allowed from the engagement of the activation switch 318 and a turn command 322 input from the pilot. In response to receiving the turn signal, the actuator 280 will turn the nosewheel assembly 254 so that the first nosewheel 272 and the second nosewheel 276 move from a first angle to a second angle with respect to the longitudinal axis of the aircraft 200. For example, the turning of nosewheel assembly 254 by the actuator 280 can move the first nosewheel 272 and the second nosewheel 276 from a first angle of zero degrees from the longitudinal axis of the aircraft 200 to a second angle of 90 degrees or more from the longitudinal axis of the aircraft 200. It shall be noted that nosewheel assembly 254 is capable of moving more or less than 90 degrees, and the angle of the selected turn may depend on the size and speed of the selected turn.

The thrust controller 306 is communicatively coupled to the plurality of thrust-producing devices 226a-h, one or more ground status sensors 326, and one or more ground speed sensors 330. The one or more ground status sensors 326 could include a weight-on-wheel switch or global positioning system (GPS) to determine if the aircraft 200 is on the ground. For example, if a weight-on-wheel switch senses weight, then the aircraft is on the ground. The one or more ground speed sensors 330 can include wheel speed sensors, inertial reference sensors and/or a GPS sensor to determine that the aircraft is on the ground. For example, if one of the ground speed sensors 330, such as the GPS sensor, indicates that the aircraft has zero speed then the aircraft is determined to be on the ground.

The thrust controller 306 is also communicatively coupled to the plurality of thrust producing devices 226a-h and configured to control power to the thrust-producing devices 226a-h. The thrust controller 306 is further configured to transmit a differential thrust signal to one or more thrust-producing devices 226a-h to augment a selected turn. For example, during a left turn as illustrated in FIG. 2 the thrust controller 306 can transmit a positive thrust signal to thrust-producing device 226a and/or a negative thrust signal to thrust-producing device 226h. Positive thrust from thrust-producing device 226a is indicated by the directional arrow in FIG. 2 in the forward direction along the aircraft's 200 longitudinal axis, or towards the nose 223. Conversely, negative thrust from thrust-producing device 226h is indicated by the directional arrow in FIG. 2 in the reverse direction along the aircraft's 200 longitudinal axis, or towards the tail 224. Further disclosure for an aircraft 200 capable of differential thrust can be found in U.S. patent application Ser. No. 18/114,828 filed on Feb. 27, 2023, the disclosure of which is incorporated by reference herein in its entirety. However, before the thrust controller 306 sends a thrust signal to the thrust-producing devices 226a-h, the thrust controller 306 will determine that a turn is allowed based on the engagement status of the activation switch 318 and by verifying that the aircraft is on the ground through the ground status sensors 326 and/or the ground speed sensors 330.

The turn radius control system 300 is configured to allow the aircraft 200 to turn within one wingspan (i.e., the length of the first outboard end 214 of the first wing 202 to the second outboard end 222 of the second wing 206) or more. In order to start the minimized turn radius maneuver, the pilot will engage the activation switch 318, which sends an activation signal to the command module 314 that a selected turn is allowed. In some embodiments, the turn radius control system 300 includes a turn indication operatively coupled to aircraft 200 that can provide audio and/or visual indications that a selected turn is impending or actually occurring. For example, the turn indication can be energized when the activation switch 318 is engaged and provide an audio and/or visual indication that a selected turn is occurring while the activation switch is engaged. Once the pilot inserts a turn command 322, such as through the deflection of rudder pedals and/or steering tiller, the command module 314 will transmit a turn command signal to the steering controller 310 and the thrust controller 306 that a selected turn is requested.

In response to receiving the turn command signal from the command module 314, the steering controller 310 will send a turn signal to the actuator 280 of the nosewheel assembly 254 to rotate the shaft 278 causing the first nosewheel 272 and the second nosewheel 276 to move from a first angle to a second angle. The turn from the first angle to the second angle may be 0 degrees to 90 degrees, respectively, with reference to the aircraft's 200 longitudinal axis based on the direction of the turn command 322 input. However, the nosewheel assembly 254 is capable of moving less than 90 degrees with reference to the aircraft's 200 longitudinal axis depending on the size and speed of the turn. After the actuator 280 has rotated the shaft 278 so that the first nosewheel 272 and the second nosewheel 276 are at the second angle, the thrust controller 306 will verify that the aircraft 200 is on the ground and safe to turn through the ground status sensors 326 and the ground speed sensors 330. If the aircraft 200 is in fact on the ground and the thrust controller 306 has determined that it is safe to turn, the thrust controller 306 will transmit a thrust signal to one or more of the thrust-producing devices 226a-h. In some embodiments, the thrust signal will be transmitted to the outboard thrust-producing device 226a or 226h opposite of the selected turn direction. For example, for a turn to the left as illustrated by the directional arrows in FIG. 2, the thrust controller 306 will transmit a positive (e.g., in the forward direction along the aircraft's 200 longitudinal axis, or towards the nose 223) thrust signal to thrust-producing device 226a. With the nosewheel assembly 254 at a 90 degree angle from the aircraft's 200 longitudinal axis and the thrust from thrust-producing device 226a, the aircraft 200 is capable of turning about the aircraft's 200 center of gravity 284.

A turn about the aircraft's 200 center of gravity 284 allows the aircraft 200 to complete a 180 degree turn within one wingspan (or the length of the first outboard end 214 to the second outboard end 222). For example, during a 180 degree turn, the first outboard end 214 would start at it its present location and end at the location of the second outboard end 222 at the completion of the turn as illustrated by the dashed directional arrow in FIG. 2 from first outboard end 214 to second outboard end 222. Additionally, the 180 degree turn described above would also allow the first landing gear wheel 246 to end up at the location of the second landing gear wheel 250 at the completion of the turn as illustrated by the dashed directional arrow from first landing gear wheel 246 to second landing gear wheel 250 (and vice versa). In some embodiments, the thrust controller 306 will also transmit a negative, (e.g., in the reverse direction along the aircraft's 200 longitudinal axis, or towards the tail 224) thrust signal to the outboard thrust-producing device on the side of the selected turn (i.e., thrust-producing device 226*h* for a turn to the left as in the example above) in order to speed up the turn and ensure the turn radius is as small as possible.

The rotation angle or speed of the selected turn may depend on the magnitude of the turn command 322 input deflections. For example, a larger magnitude of rudder pedal deflection or steering tiller deflection may cause the aircraft 200 to turn faster than a smaller magnitude of deflection. A larger magnitude of deflection (rudder pedal and/or steering tiller) may cause the rotation angle of the shaft 278 (and therefore the rotation angle of the first nosewheel 272 and the second nosewheel 276) to be larger than a smaller magnitude of deflection. The larger magnitude of deflection (e.g., from rudder pedals and/or steering tiller) may also cause the thrust controller 306 to send additional thrust signals to additional thrust-producing devices 226*a-h*. Using the example turn to the left above, a positive thrust signal may also be transmitted to thrust-producing device 226*b* and a negative thrust signal may also be transmitted to thrust-producing device 226*g* in order to complete the turn faster. However, in other embodiments, there may be one conservative turn speed for all turns regardless of the magnitude of the turn command 322 input deflections.

Once the selected turn is complete, the pilot may then remove the turn command 322, such as by removing deflection to the rudder pedals or steering tiller. The removal of the turn command 322 will secure the thrust signal to the thrust producing devices 226*a-h* by the thrust control. After the pilot disengages the activation switch 318, the steering controller 310 may send a turn signal to the nosewheel assembly 254 against to return to the first angle (i.e., zero degrees with reference to the aircraft's 200 longitudinal axis).

It shall be noted that the above description of the use of the turn radius control system 300 is done with reference to the actions performed in the cockpit by the pilot. However, in some embodiments the aforementioned minimized turn radius maneuver could be conducted remotely through a remote control computing device. The user would use the remote control computing device to engage an activation switch 318 and insert a turn command 322 on the remote control computing device. In some embodiments, the remote control computing device could specify the direction and degrees of the selected turn through a display 426 menu or similar input device.

According to some embodiments of the present disclosure, only the outboard thrust-producing devices 226*a* or 226*h* may be used to provide power for the selected turn since the outboard thrust-producing devices 226*a* and 226*h* would require the lowest power and produce the lowest noise. However, more thrust-producing devices, such as thrust-producing devices 226*b* and 226*g* may be used to speed up a turn. In some embodiments, the same turning computer 302 may be used for straight forward or reverse motion on the ground, such as moving from a parking spot, prior to initiating a turn. In various embodiments, power from a variety of sources, such as electric hubs within nosewheels 272 and/or 276 or a braking/powering system may be used to drive a nosewheel assembly 254 rotation and/or first landing gear wheel 246 and second landing gear wheel 250 rotation instead of thrust from the thrust-producing devices 226*a-h*. In some embodiments, no controller(s) and/or computer(s) are required and the nosewheel assembly 254 will be rotated manually and the thrust-producing device 226*a-h* power selected by individual power levers for the applicable thrust-producing device 226*a-h*.

Figure 6:
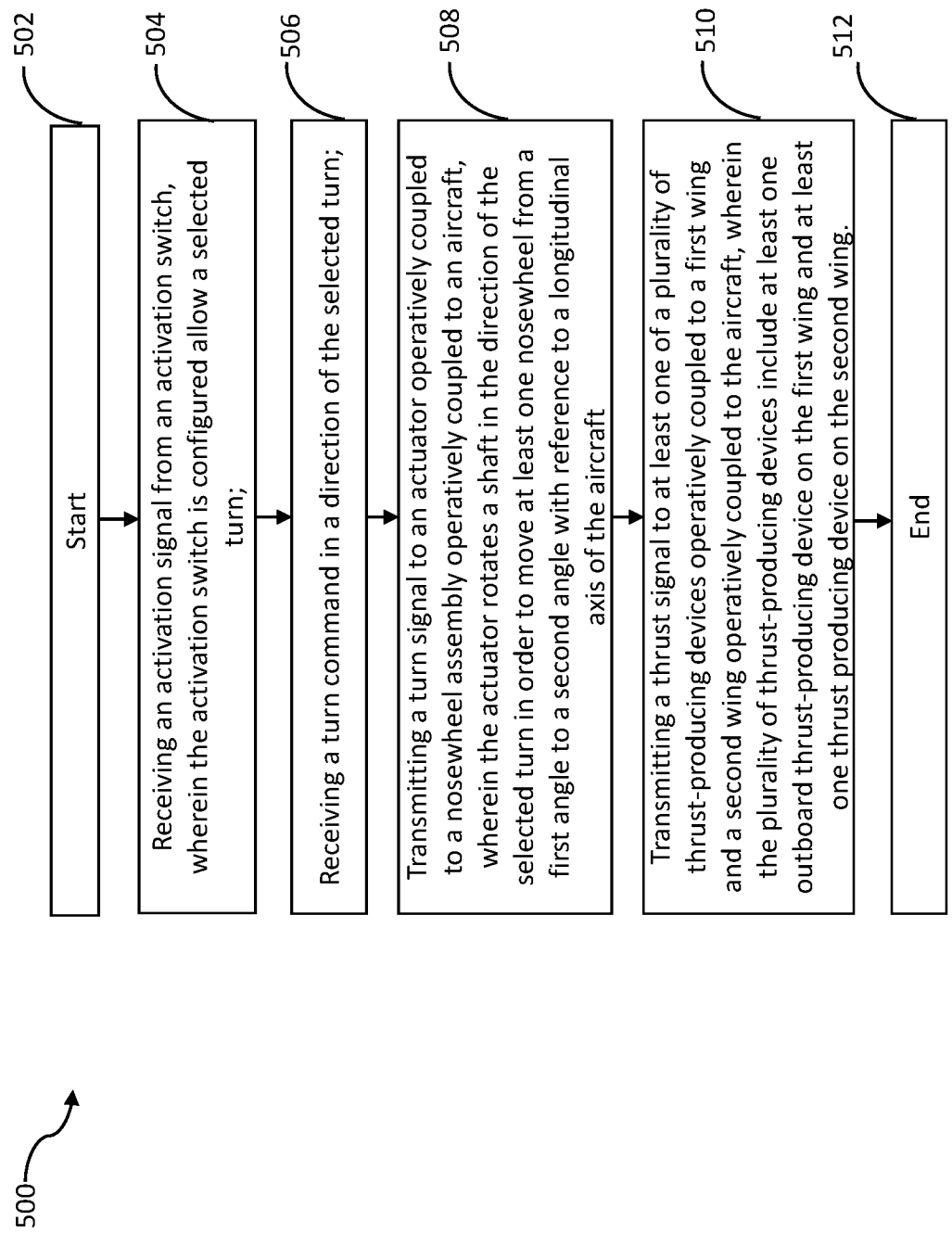
FIG. 6 illustrates a flowchart for an example method of using the turn radius control system in accordance with some embodiments of the present disclosure.

FIG. 6 illustrates a flowchart for an example method of using the turn radius control system 300 in accordance with one or more embodiments of the present disclosure. The method may start with step 502 and proceeds to step 504 that includes receiving an activation signal from the activation switch 318 once the activation switch 318 is engaged. The activation switch 318 is configured to allow a selected turn to be executed by the turn radius control system 300. In some embodiments, the method may also include energizing a turn indication based at least in part on the activation signal from the activation switch 318. At step 506 the method further includes receiving turn command 322 from rudder pedal or steering tiller deflection in the direction of the selected turn. In some embodiments, the magnitude of deflection of the turn command 322 controls the rotation angle of the aircraft 200 during the selected turn.

The method continues to step 508, which includes transmitting a turn signal to the actuator 280, which is operatively coupled to the nosewheel assembly 254, wherein the nosewheel assembly 254 is operatively coupled to the aircraft 200. Based at least in part on the turn signal, the actuator 280 moves the nosewheel assembly 254 in the direction of the selected turn by rotating a shaft 278 so that at least one nosewheel 272, 276 is moved from a first angle to a second angle with reference to the longitudinal axis of the aircraft 200. The method continues to step 510, which includes transmitting a thrust signal to at least one of the thrust-producing devices 226*a-h* operatively coupled to a first wing 202 and a second wing 206 operatively coupled to the aircraft 200. The plurality of thrust-producing devices 226*a-h* include at least one outboard thrust-producing device 226*a* on the first wing 202 and at least one outboard thrust-producing device 226*h* on the second wing 206. In some embodiments, the thrust signal is a positive thrust signal to an outboard thrust-producing device 226*a* on the first wing 202 and a negative thrust signal to an outboard thrust-producing device 226*h* on the second wing 206 based at least in part on the direction of the selected turn. In some embodiments, the thrust-producing devices 226*a-h* are EPUs. The method ends at step 512.

In some embodiments, a turn radius control system may include a nosewheel assembly operatively coupled to an aircraft. The nosewheel assembly may include at least one nosewheel, a shaft, and an actuator operatively coupled to the nosewheel assembly. The at least one nosewheel may be configured to rotate. The actuator may be configured to rotate the shaft so that the at least one nosewheel is moved from a first angle to a second angle with reference to a longitudinal axis of the aircraft. The turn radius control system may also include an activation switch operatively coupled to the aircraft and communicatively coupled to a computing device. The activation switch may be configured to allow the nosewheel assembly to move in a direction of a selected turn. The computing device may include a steering controller communicatively coupled to the nosewheel assembly and the computing device. The steering controller may be configured to transmit a turn signal to the actuator based at least in part on receiving a turn command. The actuator may then rotate the shaft in a direction of the selected turn based on the turn signal. The turn radius control system may also include a thrust controller communicatively coupled to the computing device and a plurality of thrust-producing devices operatively coupled to a first wing and a second wing of the aircraft. The thrust controller may be configured to transmit a thrust signal to at least one of the plurality of thrust-producing devices based at least in part on the turn command. The plurality of thrust-producing devices may include at least one outboard thrust-producing device on the first wing and the second wing.

In some embodiments, the activation switch may energize a turn indication operatively coupled to the aircraft to indicate the aircraft is turning when the activation switch is engaged.

In some embodiments, the turn indication may be at least one of an audio indication and a visual indication.

In some embodiments, the thrust controller may verify the aircraft is safe to turn based at least in part on a ground speed sensor and a ground status sensor.

In some embodiments, the thrust controller may, based at least in part on the direction of the turn command, transmit a positive thrust signal to the at least one outboard thrust-producing device on the first wing and a negative thrust signal to the at least one outboard thrust-producing device on the second wing.

In some embodiments, the shaft may be configured to turn the at least one nosewheel up to 90 degrees with reference to the longitudinal axis of the aircraft.

In some embodiments, the nosewheel assembly may have two nosewheels.

In some embodiments, the actuator may be configured to lock the shaft at a configured angle with reference to the longitudinal axis of the aircraft based at least in part on a status of the activation switch.

In some embodiments, the turn command may be based at least in part on a rudder pedal deflection in the direction of the selected turn.

In some embodiments, the turn command may be based at least in part on a steering tiller deflection in the direction of the selected turn.

In some embodiments, a magnitude of deflection of the turn command may control a rotation angle of the selected turn.

In some embodiments, the plurality of thrust-producing devices may be electric propulsion units.

In some embodiments, a method to minimize an aircraft turn radius may include receiving an activation signal from an activation switch. The activation switch may be configured allow a selected turn. The method may also include receiving a turn command in a direction of the selected turn. The method may also include transmitting a turn signal to an actuator operatively coupled to a nosewheel assembly operatively coupled to an aircraft. The actuator may then rotate a shaft in the direction of the selected turn in order to move at least one nosewheel from a first angle to a second angle with reference to a longitudinal axis of the aircraft. The method may also include transmitting a thrust signal to at least one of a plurality of thrust-producing devices operatively coupled to a first wing and a second wing operatively coupled to the aircraft. The plurality of thrust-producing devices may include at least one outboard thrust-producing device on the first wing and at least one thrust producing device on the second wing.

In some embodiments, the method may include energizing a turn indication based at least in part on the activation signal from the activation switch.

In some embodiments, the turn indication may be at least one of an audio and visual indication.

In some embodiments, the thrust signal may be a positive thrust signal to an outboard thrust-producing device on the first wing and a negative thrust signal to an outboard thrust-producing device on the second wing based at least in part on the direction of the selected turn.

In some embodiments, the turn command may be based at least in part on a rudder pedal input in the direction of the selected turn.

In some embodiments, the turn command may be based at least in part on a steering tiller input in the direction of the selected turn.

In some embodiments, a magnitude of deflection of the turn command may control a rotation angle of the selected turn.

In some embodiments, the plurality of thrust-producing devices may be electric propulsion units.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN), a wireless personal area network (WPAN), CAN or ARINC. Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The modules may communicate with other modules using the interface circuit(s). Although the modules may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or user) module.

The foregoing is provided for purposes of illustrating, explaining, and describing embodiments of these disclosures. Modifications and adaptations to these embodiments will be apparent to those skilled in the art and may be made without departing from the scope or spirit of these disclosures.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A turn radius control system comprising:
    a nosewheel assembly operatively coupled to an aircraft, wherein the nosewheel assembly comprises at least one nosewheel, a shaft, and an actuator operatively coupled to the nosewheel assembly, wherein the at least one nosewheel is configured to rotate, and wherein the actuator is configured to rotate the shaft so that the at least one nosewheel is moved from a first angle to a second angle with reference to a longitudinal axis of the aircraft;
    an activation switch operatively coupled to the aircraft and communicatively coupled to a computing device, wherein the activation switch is configured to allow the nosewheel assembly to move in a direction of a selected turn,
    wherein the computing device comprises:
        a steering controller communicatively coupled to the nosewheel assembly and the computing device, wherein the steering controller is configured to transmit a turn signal to the actuator based at least in part on receiving a turn command, wherein the actuator rotates the shaft in a direction of the selected turn based on the turn signal; and
        a thrust controller communicatively coupled to the computing device and a plurality of thrust-producing devices operatively coupled to a first wing and a second wing of the aircraft, wherein the thrust controller is configured to transmit a thrust signal to at least one of the plurality of thrust-producing devices based at least in part on the turn command, and wherein the plurality of thrust-producing devices include at least one outboard thrust-producing device on the first wing and the second wing.

2. The turn radius control system of claim 1, wherein the activation switch energizes a turn indication operatively coupled to the aircraft to indicate the aircraft is turning when the activation switch is engaged.

3. The turn radius control system of claim 2, wherein the turn indication is at least one of an audio indication or a visual indication.

4. The turn radius control system of claim 1, wherein the thrust controller verifies the aircraft is safe to turn based at least in part on a ground speed sensor and a ground status sensor.

5. The turn radius control system of claim 1, wherein the thrust controller, based at least in part on the direction of the turn command, transmits a positive thrust signal to the at least one outboard thrust-producing device on the first wing and a negative thrust signal to the at least one outboard thrust-producing device on the second wing.

6. The turn radius control system of claim 1, wherein the shaft is configured to turn the at least one nosewheel up to 90 degrees with reference to the longitudinal axis of the aircraft.

7. The turn radius control system of claim 1, wherein the nosewheel assembly comprises two nosewheels.

8. The turn radius control system of claim 1, wherein the actuator is configured to lock the shaft at a configured angle with reference to the longitudinal axis of the aircraft based at least in part on a status of the activation switch.

9. The turn radius control system of claim 1, wherein the turn command is based at least in part on a rudder pedal deflection in the direction of the selected turn.

10. The turn radius control system of claim 1, wherein the turn command is based at least in part on a steering tiller deflection in the direction of the selected turn.

11. The turn radius control system of claim 1, wherein a magnitude of deflection of the turn command controls a rotation angle of the selected turn.

12. The turn radius control system of claim 1, wherein the plurality of thrust-producing devices are electric propulsion units.

13. A method to minimize an aircraft turn radius comprising:
- receiving an activation signal from an activation switch, wherein the activation switch is configured allow a selected turn;
- receiving a turn command in a direction of the selected turn;
- transmitting a turn signal to an actuator operatively coupled to a nosewheel assembly operatively coupled to the aircraft, wherein the actuator rotates a shaft in the direction of the selected turn in order to move at least one nosewheel from a first angle to a second angle with reference to a longitudinal axis of the aircraft; and
- transmitting a thrust signal to at least one of a plurality of thrust-producing devices operatively coupled to a first wing and a second wing operatively coupled to the aircraft, wherein the plurality of thrust-producing devices include at least one outboard thrust-producing device on the first wing and at least one outboard thrust producing device on the second wing.

14. The method of claim 13, further comprising energizing a turn indication based at least in part on the activation signal from the activation switch.

15. The method of claim 14, wherein the turn indication is at least one of an audio indication or visual indication.

16. The method of claim 13, wherein the thrust signal is a positive thrust signal to the at least one outboard thrust-producing device on the first wing and a negative thrust signal to the at least one outboard thrust-producing device on the second wing based at least in part on the direction of the selected turn.

17. The method of claim 13, wherein the turn command is based at least in part on a rudder pedal input in the direction of the selected turn.

18. The method of claim 13, wherein the turn command is based at least in part on a steering tiller input in the direction of the selected turn.

19. The method of claim 13, wherein a magnitude of deflection of the turn command controls a rotation angle of the selected turn.

20. The method of claim 13, wherein the plurality of thrust-producing devices are electric propulsion units.

* * * * *